(12) United States Patent
Yeh

(10) Patent No.: US 8,223,966 B2
(45) Date of Patent: Jul. 17, 2012

(54) MULTIPLE STREAM DECRYPTING AND DECODING SYSTEMS AND RELATED METHODS THEREOF

(75) Inventor: You-Min Yeh, Chi-Lung (TW)

(73) Assignee: MediaTek Inc., Science-Based Industrial Park, Hsin-Chu (TW)

( * ) Notice: Subject to any disclaimer, the term of this patent is extended or adjusted under 35 U.S.C. 154(b) by 990 days.

(21) Appl. No.: 11/538,059

(22) Filed: Oct. 3, 2006

(65) Prior Publication Data

US 2007/0263866 A1    Nov. 15, 2007

Related U.S. Application Data

(60) Provisional application No. 60/746,893, filed on May 10, 2006.

(51) Int. Cl.
*H04L 29/06* (2006.01)
(52) U.S. Cl. .......................................... 380/212; 386/357
(58) Field of Classification Search .................. 380/212; 386/357
See application file for complete search history.

(56) References Cited

U.S. PATENT DOCUMENTS

| | | | | |
|---|---|---|---|---|
| 4,644,533 A | * | 2/1987 | Braff et al. | 370/411 |
| 5,835,730 A | * | 11/1998 | Grossman et al. | 709/247 |
| 6,463,059 B1 | * | 10/2002 | Movshovich et al. | 370/389 |
| 2002/0118680 A1 | * | 8/2002 | Lee | 370/389 |
| 2003/0231535 A1 | * | 12/2003 | Pfeiffer et al. | 365/200 |
| 2004/0090291 A1 | * | 5/2004 | Rakib et al. | 334/1 |
| 2005/0060420 A1 | * | 3/2005 | Kovacevic | 709/231 |
| 2005/0152546 A1 | * | 7/2005 | Kangas | 380/210 |
| 2006/0023881 A1 | * | 2/2006 | Akiyama et al. | 380/210 |
| 2007/0101358 A1 | * | 5/2007 | Ambady | 725/31 |
| 2007/0180532 A1 | * | 8/2007 | Cha et al. | 726/25 |
| 2007/0183452 A1 | * | 8/2007 | Hryszko et al. | 370/474 |

OTHER PUBLICATIONS

Microsoft, "Microsoft® Computer Dictionary, Fifth Edition" Microsoft Press, p. 446.*
CableLabs, "OpenCable™ Specifications; CableCARD™ Interface 2.0 Specification," Jan. 26th 2006, OC-SP-CC1F2.0-I04-060126.*
CableLabs, "OpenCable™ Specifications; CableCARD™ Interface 2.0 Specification," Jan. 26, 2006, OC-SP-CCIF2.0-I04-060126.*

* cited by examiner

*Primary Examiner* — Kambiz Zand
*Assistant Examiner* — Michael Guirguis
(74) *Attorney, Agent, or Firm* — Winston Hsu; Scott Margo

(57) ABSTRACT

A system for decrypting multiple transport streams is disclosed. The system includes: a Multiple Transport stream Multiplexer (M-Mux), for receiving at least a first transport stream and a second transport stream, and outputting a resultant transport stream; a multiple transport stream decryption card for decrypting the resultant transport stream to output a decrypted transport stream; a Source Multiplexer (S-Mux) for receiving the decrypted transport stream from the multiple transport stream decryption card and the resultant transport stream, and outputting a final resultant transport stream; and a Multiple Transport Stream Processor (M-Processor) for receiving the final resultant transport stream, and sending the final resultant transport stream to a corresponding framer.

18 Claims, 5 Drawing Sheets

US 8,223,966 B2

MULTIPLE STREAM DECRYPTING AND DECODING SYSTEMS AND RELATED METHODS THEREOF

CROSS REFERENCE TO RELATED APPLICATIONS

The application claims the benefit of U.S. Provisional Application No. 60/746,893, filed on May 10, 2006 and included herein by reference.

BACKGROUND

The present invention relates to Digital TV decoding systems, and more particularly to a Digital TV decoding system that incorporates a multiple transport stream decryption card.

A CableCARD, or Point of Decryption card (POD) is a security module that enables a cable line to be directly plugged into a television set, without requiring a set-top box. The CableCARD provides conditional access and network connection for the television set, by decrypting received transport streams. Conventionally, CableCARDS are capable of processing single streams, meaning they can only decrypt/decode one transport stream at a time. For example, as defined by the CableCARD Interface 1.0 Specification, the Cable-CARDS are implemented for single-stream decryption/decoding. Current digital technology, however, requires multiple-stream cards in order to perform all digital functions, such as displaying one stream while recording another, or for picture in picture (PIP) mode. To meet these demands, manufacturers have developed a multiple point of decryption (M-POD) card that has the ability of decrypting multiple transport streams, and can operate in both Single-Stream mode and Multi-Stream mode. For example, as defined by the CableCARD Interface 2.0 Specification, the M-POD card is capable of receiving and processing multiple transport streams. The new standard therefore will also enable two-way functions, such as pay-per-view, Video On Demand, and electronic program guides.

It is desired to provide a novel multiple transport stream decrypting and decoding architecture that can perform the decryption efficiently with reduced hardware complexity.

SUMMARY

Systems including a multiple transport stream decryption card are disclosed. A first embodiment of the systems comprises: a Multiple Transport stream Multiplexer (M-Mux), for receiving at least a first transport stream and a second transport stream, and outputting a resultant transport stream; a multiple transport stream decryption card, coupled to the M-Mux, for decrypting the resultant transport stream to output a decrypted transport stream; a Source Multiplexer (S-Mux), coupled to the multiple transport stream decryption card and the M-Mux, for receiving the decrypted transport stream from the multiple transport stream decryption card and the resultant transport stream from the M-Mux, and outputting a final resultant transport stream; and a Multiple Transport Stream Processor (M-Processor), coupled to the S-Mux, for receiving the final resultant transport stream, and sending the final resultant transport stream to a corresponding framer of a transport stream demultiplexer (Demux).

A second embodiment of the systems comprises: a Multiple Transport stream Multiplexer (M-Mux), for receiving at least a first transport stream and a second transport stream, and outputting a resultant transport stream according to a first selection signal; a multiple transport stream decryption card, coupled to the M-Mux, for decrypting the resultant transport stream to output a decrypted transport stream; a Multiple Transport Stream Processor (M-Processor), coupled to the multiple transport stream decryption card, for receiving the decrypted transport stream, and outputting a first decrypted stream corresponding the first transport stream or a second decrypted stream corresponding the second transport stream, according to a second selection signal; a first Source Multiplexer (S-Mux), coupled to the first transport stream and the M-Processor, for receiving the first transport stream and the first decrypted stream, and outputting a first resultant decrypted transport stream to a corresponding framer according to a third selection signal; and a second S-Mux, coupled to the second transport stream and the M-Processor, for receiving the second transport stream and the second decrypted stream, and outputting a second resultant decrypted transport stream to a corresponding framer according to the third selection signal.

A third embodiment of the systems comprises: a Multiple Transport stream Multiplexer (M-Mux), for receiving at least a first transport stream and a second transport stream, and outputting a resultant transport stream; a multiple transport stream decryption card, coupled to the M-Mux, for decrypting the resultant transport stream to output a decrypted transport stream; a first Multiple Transport Stream Processor (M-Processor), coupled to the M-Mux, for receiving the resultant transport stream, and outputting a first stream corresponding to the first transport stream or a second stream corresponding to the second transport stream; and a second M-Processor, coupled to the multiple transport stream decryption card, for receiving the decrypted transport stream, and outputting a first decrypted stream corresponding the first transport stream or a second decrypted stream corresponding the second transport stream.

Further, a method for setting a bandwidth limit to the multiple stream decryption and decoding system is also provided. The method comprises: authenticating a multiple transport stream decryption card; sending a transport stream through the system; extracting program information from the transport stream; utilizing the program information to set a bandwidth limit to the system; and enabling the multiple transport stream decryption card.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
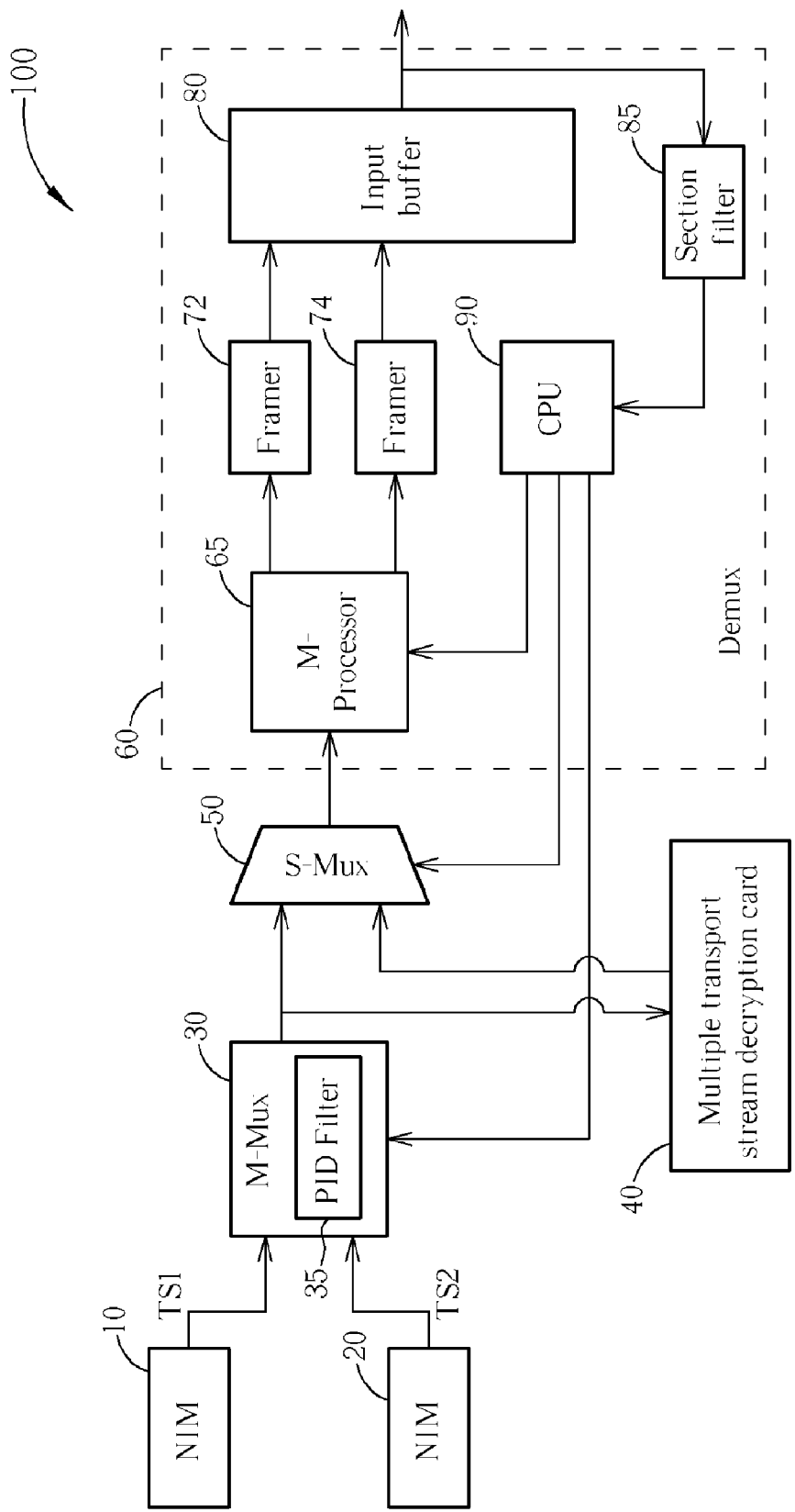
FIG. 1 is a diagram of a multiple transport stream decrypting and decoding system according to a first embodiment of the present invention.

Please refer to FIG. 1. FIG. 1 is a diagram of a multiple transport stream decrypting and decoding system 100 according to a first embodiment of the present invention, comprising a multiple transport stream decryption card 40. For simplicity, the system 100 only shows two tuner+demodulator units (NIMs) 10, 20 respectively. Please note, however, that this is not a limitation of the present invention, and the number of connected NIMs depends on a capacity of the multiple transport stream decryption card 40. Please note that in the following description, the term 'CableCARD' will be utilized, where CableCARD is a trademarked name of one embodiment of a multiple transport stream decryption card. The disclosed invention applies to any decryption cards that can support multiple transport stream decrypting and decoding, however.

A first NIM 10 and a second NIM 20 are coupled to a Multiple Transport stream multiplexer (M-Mux) 30, for outputting a first transport stream (TS) TS1 and a second transport stream TS2 respectively. The two transport streams TS1 and TS2 are multiplexed by the M-Mux 30, and pre-headers comprising 12 bytes of information (such as the identification number of each transport stream) are added for identification purposes. The multiplexed TS is sent to a CableCARD 40, and also to a Source Multiplexer (S-Mux) 50. The CableCARD 40 decrypts the received multiplexed TS and sends the decrypted TS to the S-Mux 50. The S-Mux 50 then multiplexes the original multiplexed TS and the decrypted multiplexed TS into a single TS, which is then output to a demux 60. An embodiment of the demux 60 comprises a multiple transport stream processor (M-processor) 65, a first framer 72, a second framer 74, an input buffer 80, a section filter 85, and a Central Processing Unit (CPU) 90. The Central Processing Unit (CPU) 90, 290, 390, and 490 could be a transport stream layer, packetized elementary stream layer, or elementary stream layer processor inside the demux 60, or it could be a system processor of the whole chip or whole MPEG decoding system outside the demux 60 to control the whole system to function. Here, the M-Processor 65 acts as a demultiplexer with a single input and multiple outputs. As each original TS comprises the pre-header, when the M-Processor 65 demultiplexes the transport streams and strips every pre-header, it can determine which framer each TS should be framed in according to the attached ID in the pre-header. After the transport streams are framed using the framers 72, 74, they can then be sent to the input buffer 80, for being output to a destination apparatus, such as a digital television. It should be noted that the inclusion of the S-Mux 50 reduces the number of transport streams being input to the M-Processor 65, thereby reducing the complexity of synchronization of the system 100.

As the CableCARD 40 has a limited bandwidth, the disclosed system 100 also includes a Packet Identifier (PID) Filter 35, for controlling the data rate from the M-Mux 30 to the CableCARD 40. Initially, the transport streams are sent directly to the CPU 90 and Section Tables are extracted. The CPU 90 then determines what the wanted PIDs are, and will set the PID filter 35 accordingly. This particularly applies to a system that utilizes many transport streams. The PID filter 35 serves as a cut-off bandwidth point for the CableCARD 40.

Figure 2:
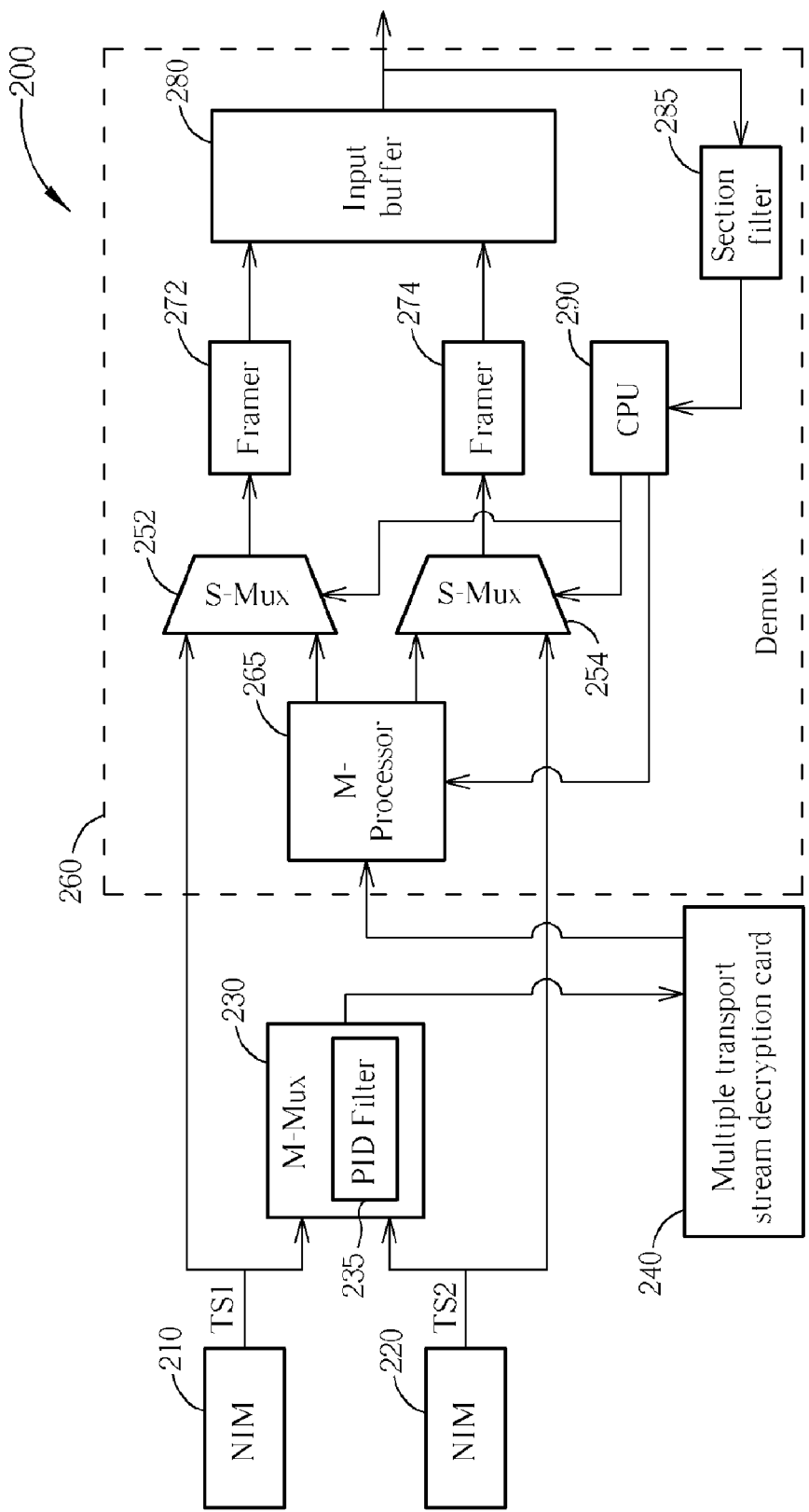
FIG. 2 is a diagram of a multiple transport stream decrypting and decoding system according to a second embodiment of the present invention.

The disclosed system 100 of FIG. 1 can also be modified while retaining the disclosed advantages. Please refer to FIG. 2. FIG. 2 is a diagram of a multiple transport stream decrypting and decoding system 200 according to a second embodiment of the present invention. As can be seen, the system 200 in FIG. 2 comprises two Source Multiplexers (S-Mux) 252, 254 respectively. In this embodiment, the first transport stream TS1 is sent directly to a first S-Mux 252, and the second transport stream TS2 is sent directly to a second S-Mux 254. The first transport stream TS1 and the second transport stream TS2 are also sent directly to the M-Mux 230, multiplexed, and sent to the CableCARD 240. The multiplexed TS will not be sent directly to the M-Processor 265, however. The M-Processor 265 only receives the decrypted multiplexed TS output from the CableCARD 240, demultiplexes the decrypted multiplexed TS and sends a first decrypted TS to the first S-Mux 252, and a second decrypted TS to the second S-Mux 254. The first S-Mux 252 then selects a first multiplexed TS from the first TS and the first decrypted TS according to a selection signal provided by the CPU 290, and the second S-Mux 254 selects a second multiplexed TS from the second TS and the second decrypted TS according to the selection signal. The CPU 290 generates the selection signal in accordance with the usage of the CableCARD. The first multiplexed TS will then be sent to a first framer 272, and the second multiplexed TS will be sent to a second framer 274. Please note that the inclusion of an extra S-Mux and the reversal of the M-Processor and S-Mux connection means that each TS does not need a pre-header, and is delivered utilizing the conventional MPEG-2 standard.

Figure 3:
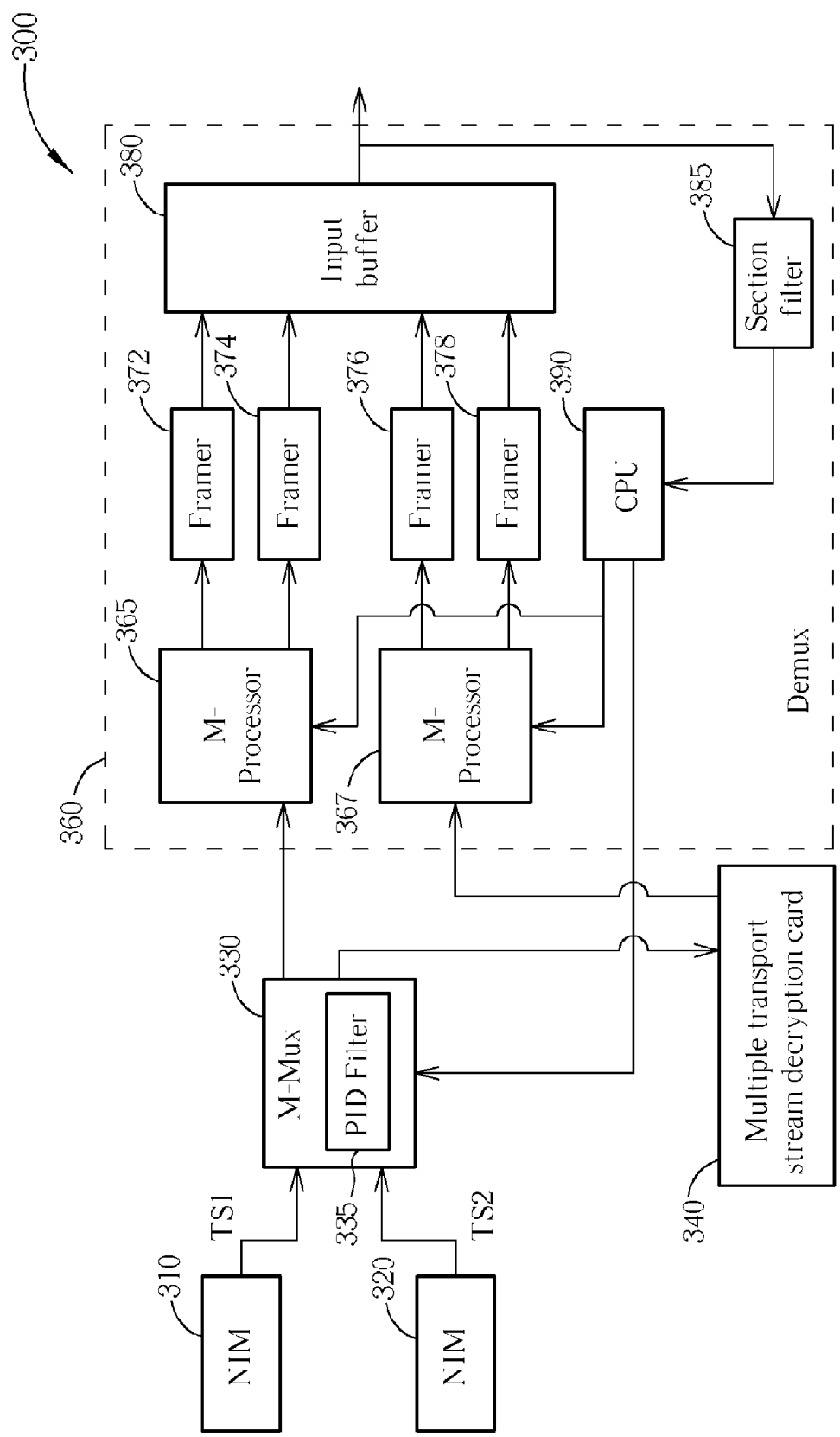
FIG. 3 is a diagram of a multiple transport stream decrypting and decoding system according to a third embodiment of the present invention.

Please refer to FIG. 3. FIG. 3 is a diagram of a multiple transport stream decrypting and decoding system 300 according to a third embodiment of the present invention. The system 300 shown in FIG. 3 utilizes an extra M-Processor for replacing the function of the S-Mux. Please note that this system 300 requires two extra framers. As before, the first transport stream TS1 and the second transport stream TS2 are sent to the M-Mux 330, where they are multiplexed to output a multiplexed TS. The multiplexed TS is directly input to a first M-Processor 365. The multiplexed TS is also input to the CableCARD 340, decrypted, and output to a second M-Processor 367. The first M-Processor 365 will demultiplex the multiplexed TS (the transport streams received directly from the NIMs 310, 320) to a first framer 372 and a second framer 374. The second M-Processor 367 will demultiplex the decrypted multiplexed TS to a third framer 376 and a fourth framer 378. The advantage of this embodiment is that it contains fewer multiplexing-demultiplexing stages.

Figure 4:
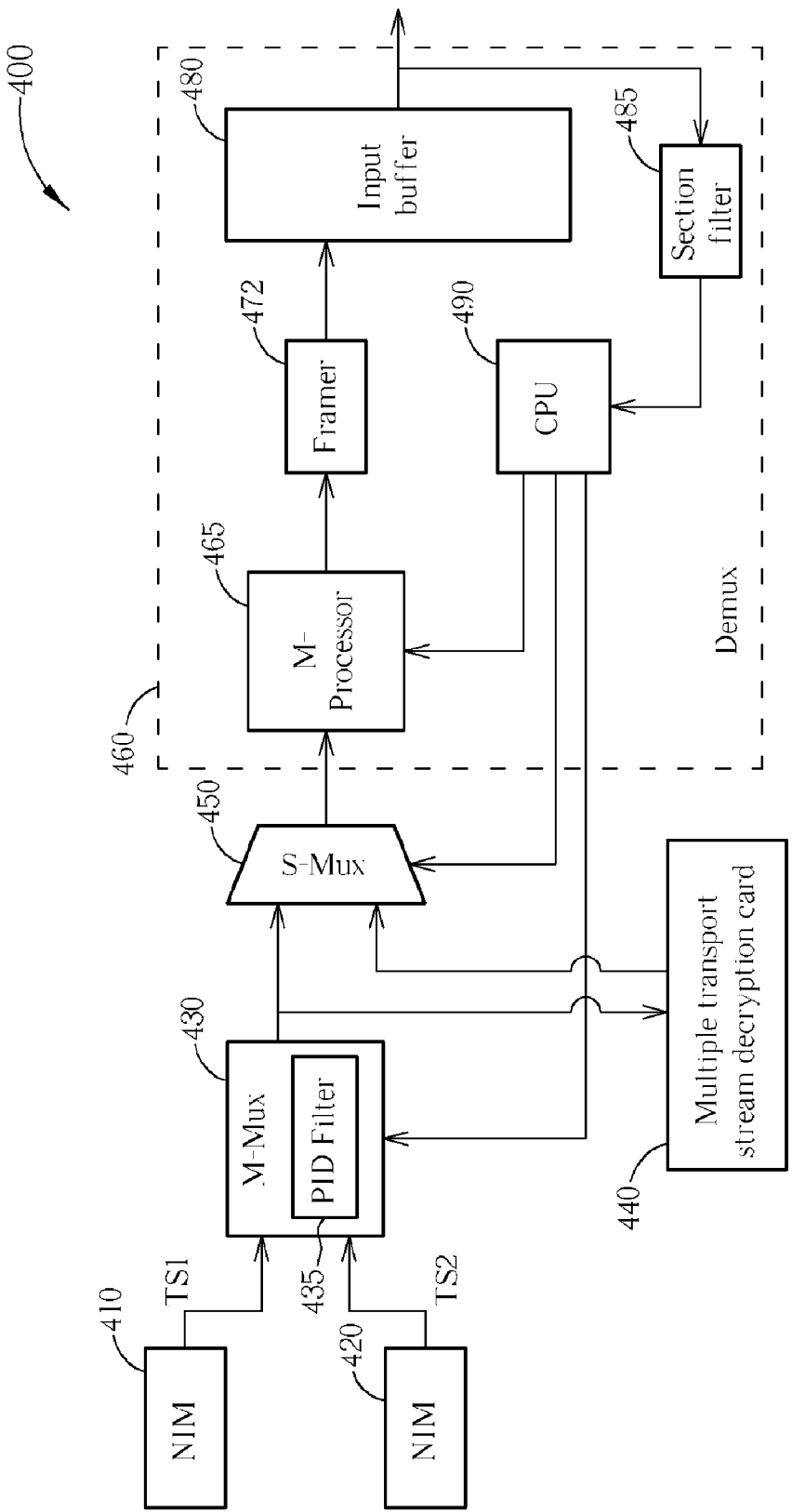
FIG. 4 is a diagram of a multiple transport stream decrypting and decoding system according to a fourth embodiment of the present invention.

Please refer to FIG. 4. FIG. 4 is a diagram of a multiple transport stream decrypting and decoding system 400 according to a fourth embodiment of the present invention. The system 400 is almost the same as the system 100 shown in FIG. 1, except this system 400 only comprises one framer 472. When the output of the S-Mux 450 reaches the M-Processor 465, each TS in the multiplexed signal contains a pre-header. The framer 472 has a flexible index, meaning it can support receiving transport streams TS1, TS2 from both NIMs 410, 420 respectively simply by changing the index. The M-Processor 465 receives the TS from the S-Mux 450, and removes the pre-headers from each TS, so each TS is now in a standard MPEG format. The M-Processor 465 will then generate a new index signal accompanying the TS according to which TS is finally selected to be framed in the framer 472. Please note that the selection of the TS is controlled by the CPU 490. Compared to the frames in the other embodiments (such as framers 72, 74, 272, 274), the framer 472 processes at a faster rate, for example, two times the processing rate in the case of processing the TS multiplexed from two transport streams.

A method for setting the PID filter 35, 235, 335, 435 to eliminate unwanted bandwidth is also disclosed. Initially, the system 100, 200, 300, 400 authenticates the CableCARD 40, 240, 340, 440 by confirming the CableCARD 40, 240, 340, 440 has been inserted. Then, the transport streams are sent directly from the NIMs 10, 20, 210, 220, 310, 320, 410, 420 to the input buffer 80, 280, 380, 480. The Section Tables are extracted, utilizing the Section Filter 85, 285, 385, 485, and the result sent to the CPU 90, 290, 390, 490. From this information, the CPU 90, 290, 390, 490 is able to determine wanted Packet Identifiers, which it sets to the S-Mux 50, 252, 254, 450 (or M-Processor 365, 367 in the third embodiment). The CPU 90, 290, 390, 490 already knows the bandwidth limit of the inserted CableCARD 40, 240, 340, 440. If the bandwidth is insufficient to support all desired PIDs, the CPU 90, 290, 390, 490 will further utilize the determined PIDs to set the PID filter 35, 235, 335, 435. At this stage, the system 100, 200, 300, 400 can then enable the CableCARD 40, 240, 340, 440.

Figure 5:
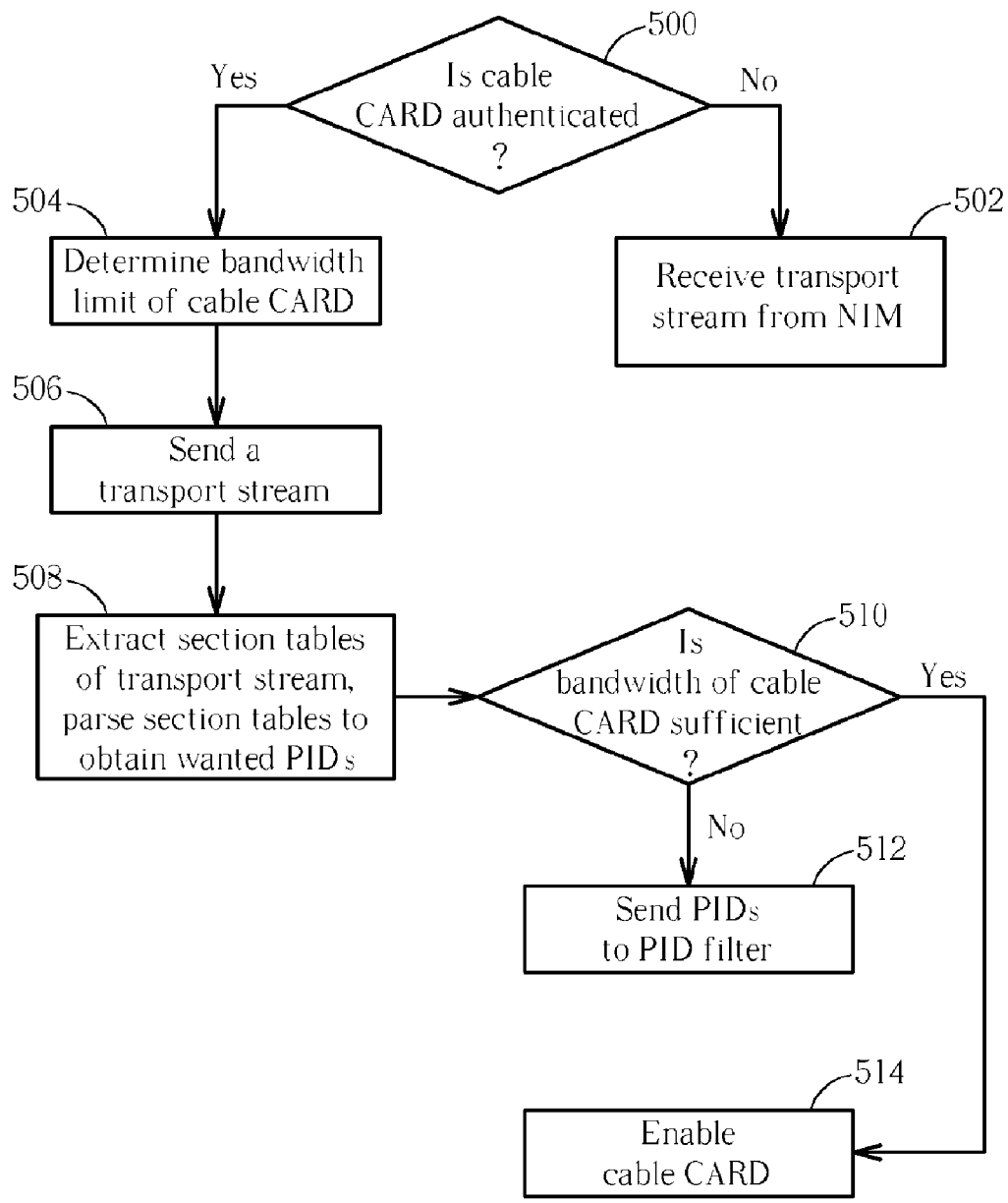
FIG. 5 is a flowchart detailing steps of the method of the present invention.

Please refer to FIG. 5. FIG. 5 is a flowchart detailing the steps of the above-disclosed method. The steps are as follows:

Step 500: Is the CableCARD authenticated? If yes go to Step 504, if no go to Step 502;

Step 502: Receive transport stream from NIM;

Step 504: Determine a bandwidth limit of the CableCARD;

Step 506: Send a transport stream;

Step 508: Extract Section Tables of the transport stream, and parse the Section Tables to obtain wanted Program Identifiers (PIDs);

Step 510: Is the bandwidth of the CableCARD sufficient to support the wanted PIDs? If yes go to Step 514, if no go to Step 512;

Step 512: Set PIDs to PID Filter;

Step 514: Enable CableCARD.

Initially, authentication of a CableCARD is carried out (Step 500). If the CableCARD is not authenticated, a transport stream will be received from the NIM (Step 502). If the CableCARD is authenticated, a bandwidth limit of the CableCARD is determined (Step 504). A transport stream is then sent (Step 506) and Section Tables extracted and parsed to obtain wanted Program Identifiers (Step 508). It is then determined if the bandwidth of the CableCARD is sufficient to support all wanted PIDs (Step 510). If it is sufficient then the CableCARD will be enabled (Step 514). If the bandwidth is not sufficient, PIDs will first be set to the PID filter (Step 512), and the CableCARD will then be enabled (Step 514).

The inclusion of the S-Mux in the first, second, and fourth embodiments not only reduces the number of transport streams being input to the M-Processor, but also functions to select whether a TS from the source or from the CableCARD will be displayed. If a CableCARD is not inserted or not authenticated, the S-Mux can choose to select a transport stream from the NIM. The utilization of two M-Processors in the third embodiment also reduces the traffic on a single M-Processor. The disclosed multiple transport stream decrypting and decoding system also utilizes a PID filter, for balancing the input and output of the system. The PID filter can limit the amount of content being sent to the CableCARD, thereby ensuring the processing rate of the system can be maintained at a high level. Furthermore, the system can utilize an authentication process to set the PID filter.

In short, the disclosed system can support multiple transport stream decryption while reducing the hardware complexity of the conventional architecture defined by the Multi-Stream CableCARD specification (e.g. the CableCARD specification 2.0). Additionally, the inclusion of the PID filter prevents excess data being sent to the CableCARD.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multiple stream decrypting and decoding system, comprising:
    a Multiple Transport stream Multiplexer (M-Mux), for receiving at least a first transport stream and a second transport stream, and outputting a resultant transport stream;
    a multiple transport stream decryption card, coupled to the M-Mux, for decrypting the resultant transport stream to output a decrypted transport stream;
    a Source Multiplexer (S-Mux), coupled to the multiple transport stream decryption card and the M-Mux, for receiving the decrypted transport stream decrypted from the resultant transport stream and the resultant transport stream, and outputting a final resultant transport stream corresponding to one of the decrypted transport stream and the resultant transport stream; and
    a Multiple Transport Stream Processor (M-Processor), coupled to the S-Mux, for receiving the final resultant transport stream, and sending the final resultant transport stream to a corresponding framer.

2. The multiple stream decrypting and decoding system of claim 1, wherein the M-Mux comprises: a PID filter, for selecting specific contents to be output to the multiple transport stream decryption card.

3. The multiple stream decrypting and decoding system of claim 1, further comprising:
    a Central Processing Unit (CPU), coupled to the M-Mux, the S-Mux, and the M-Processor, for controlling operations of the M-Mux, the S-Mux, and the M-Processor.

4. The multiple stream decrypting and decoding system of claim 3, wherein the CPU further authenticates the multiple transport stream decryption card, and the CPU sends a first selection signal, a second selection signal, a third selection signal, and a determination signal according to the authentication result.

5. The multiple stream decrypting and decoding system of claim 4, wherein the M-Processor is coupled to a plurality of framers, each of the framers has a fixed index specified for framing the final resultant transport stream corresponding to a specific data source, and the M-Processor selects the framer from the framers to buffer the final resultant transport stream according to the third selection signal.

6. The multiple stream decrypting and decoding system of claim 4, wherein the M-Processor is coupled to the corresponding framer having a flexible index for framing the final resultant transport stream corresponding to a plurality of data sources.

7. The multiple stream decrypting and decoding system of claim 6, wherein the M-Processor is controlled by the third selection signal to generate a header for the final resultant transport stream according to a corresponding data source.

8. The multiple stream decrypting and decoding system of claim 1, wherein the multiple transport stream decryption card complies with the CableCARD Interface 2.0 specification.

9. A multiple stream decrypting and decoding system, comprising:
    a Multiple Transport stream Multiplexer (M-Mux), for receiving at least a first transport stream and a second transport stream, and outputting a resultant transport stream according to a first selection signal;
    a multiple transport stream decryption card, coupled to the M-Mux, for decrypting the resultant transport stream to output a decrypted transport stream;
    a Multiple Transport Stream Processor (M-Processor), coupled to the multiple transport stream decryption card, for receiving the decrypted transport stream, and outputting a first decrypted stream corresponding to the first transport stream or a second decrypted stream corresponding to the second transport stream, according to a second selection signal;

a first Source Multiplexer (S-Mux), coupled to the first transport stream and the M-Processor, for receiving the first transport stream and the first decrypted stream, and outputting a first resultant decrypted transport stream to a corresponding framer according to a third selection signal; and a second S-Mux, coupled to the second transport stream and the M-Processor, for receiving the second transport stream and the second decrypted stream, and outputting a second resultant decrypted transport stream to a corresponding framer according to the third selection signal.

10. The multiple stream decrypting and decoding system of claim 9, wherein the M-Mux comprises: a PID filter, for selecting specific contents to be output to the multiple transport stream decryption card.

11. The multiple stream decrypting and decoding system claim 9, further comprising: a Central Processing Unit (CPU), coupled to the M-Mux, the first S-Mux, the second S-Mux, and the M-Processor, for sending the first selection signal, the second selection signal, the third selection signal, and a determination signal.

12. The multiple stream decrypting and decoding system of claim 11, wherein the CPU further authenticates the multiple transport stream decryption card, and the CPU sends the first selection signal, the second selection signal, the third selection signal, and the determination signal according to the authentication result.

13. The multiple stream decrypting and decoding system of claim 9, wherein the multiple transport stream decryption card complies with the CableCARD Interface 2.0 specification.

14. A multiple stream decrypting and decoding system, comprising:

a Multiple Transport stream Multiplexer (M-Mux), for receiving at least a first transport stream and a second transport stream, and outputting a resultant transport stream;

a multiple transport stream decryption card, coupled to the M-Mux, for decrypting the resultant transport stream to output a decrypted transport stream;

a first Multiple Transport Stream Processor (M-Processor), coupled to the M-Mux, for receiving the resultant transport stream, and outputting a first stream corresponding to the first transport stream or a second stream corresponding to the second transport stream; and a second M-Processor, coupled to the multiple transport stream decryption card, for receiving the decrypted transport stream, and outputting a first decrypted stream corresponding to the first transport stream or a second decrypted stream corresponding to the second transport stream.

15. The multiple stream decrypting and decoding system of claim 14, wherein the M-Mux comprises: a PID filter, for selecting specific contents to be output to the multiple transport stream decryption card.

16. The multiple stream decrypting and decoding system of claim 14, further comprising: a Central Processing Unit (CPU), coupled to the M-Mux, the first M-Processor, and the second M-Processor, for controlling operations of the M-Mux, the first M-Processor, and the second M-Processor.

17. The multiple stream decrypting and decoding system of claim 16, wherein the first M-Processor and the second M-Processor are coupled to a plurality of framers, and each of the framers has a fixed index corresponding to a specific data source, and the CPU controls which framer is utilized.

18. The multiple stream decrypting and decoding system of claim 14, wherein the multiple transport stream decryption card complies with the CableCARD Interface 2.0 specification.

* * * * *